United States Patent [19]
Sakata et al.

[11] Patent Number: 4,922,437
[45] Date of Patent: May 1, 1990

[54] IMAGE INFORMATION PROCESSING APPARATUS

[75] Inventors: Yoshio Sakata; Masami Taoda, both of Yokohama, Japan

[73] Assignee: Kabushiki Kaisha Toshiba, Kawasaki, Japan

[21] Appl. No.: 137,863

[22] Filed: Dec. 24, 1987

[30] Foreign Application Priority Data

Dec. 25, 1986 [JP] Japan ................. 61-311514
Apr. 30, 1987 [JP] Japan ................. 62-106842

[51] Int. Cl.$^5$ ................. G06F 15/20; G06F 3/12
[52] U.S. Cl. ................. 364/514; 364/200;
364/900; 364/249.4; 364/237.83; 364/951.3;
382/65; 365/215; 365/221
[58] Field of Search ........ 364/200, 900, 514;
382/61, 65, 69; 360/10.1; 365/215, 221

[56] References Cited

U.S. PATENT DOCUMENTS

| 4,041,463 | 8/1977 | Slutzky et al. | 364/900 |
| 4,062,059 | 12/1977 | Suzuki et al. | 364/900 |
| 4,125,870 | 11/1978 | Suzuki et al. | 364/900 |
| 4,224,481 | 9/1980 | Russell | 360/221 |
| 4,300,206 | 11/1981 | Belleson et al. | 364/900 |
| 4,355,306 | 10/1982 | Mitchell | 364/900 |
| 4,442,503 | 4/1984 | Schutt et al. | 364/900 |
| 4,480,314 | 10/1984 | McKelley et al. | 364/900 |
| 4,486,854 | 12/1984 | Yuni | 364/900 |
| 4,513,390 | 4/1985 | Walter et al. | 364/900 |
| 4,527,252 | 7/1985 | Donohue et al. | 364/900 |
| 4,587,635 | 5/1986 | Hashimoto et al. | 364/900 |
| 4,625,273 | 11/1986 | Wollinden et al. | 364/200 |

OTHER PUBLICATIONS

Miller et al., "High Speed FIFO's"; Computer Design Sep. 1, 1985.

Primary Examiner—Parshotam S. Lall
Assistant Examiner—Ellis B. Ramirez
Attorney, Agent, or Firm—Finnegan, Henderson, Farabow, Garrett and Dunner

[57] ABSTRACT

An image information processing apparatus includes an image memory having a page memory area for storing image information and a FIFO memory area which is provided integrally with the page memory and a read-/write operation of which is controlled independently of the page memory area. Coded image information supplied from a recording unit is transferred to a codec circuit through the FIFO memory area and decoded by the codec circuit. The decoded information is stored in the page memory area.

9 Claims, 6 Drawing Sheets

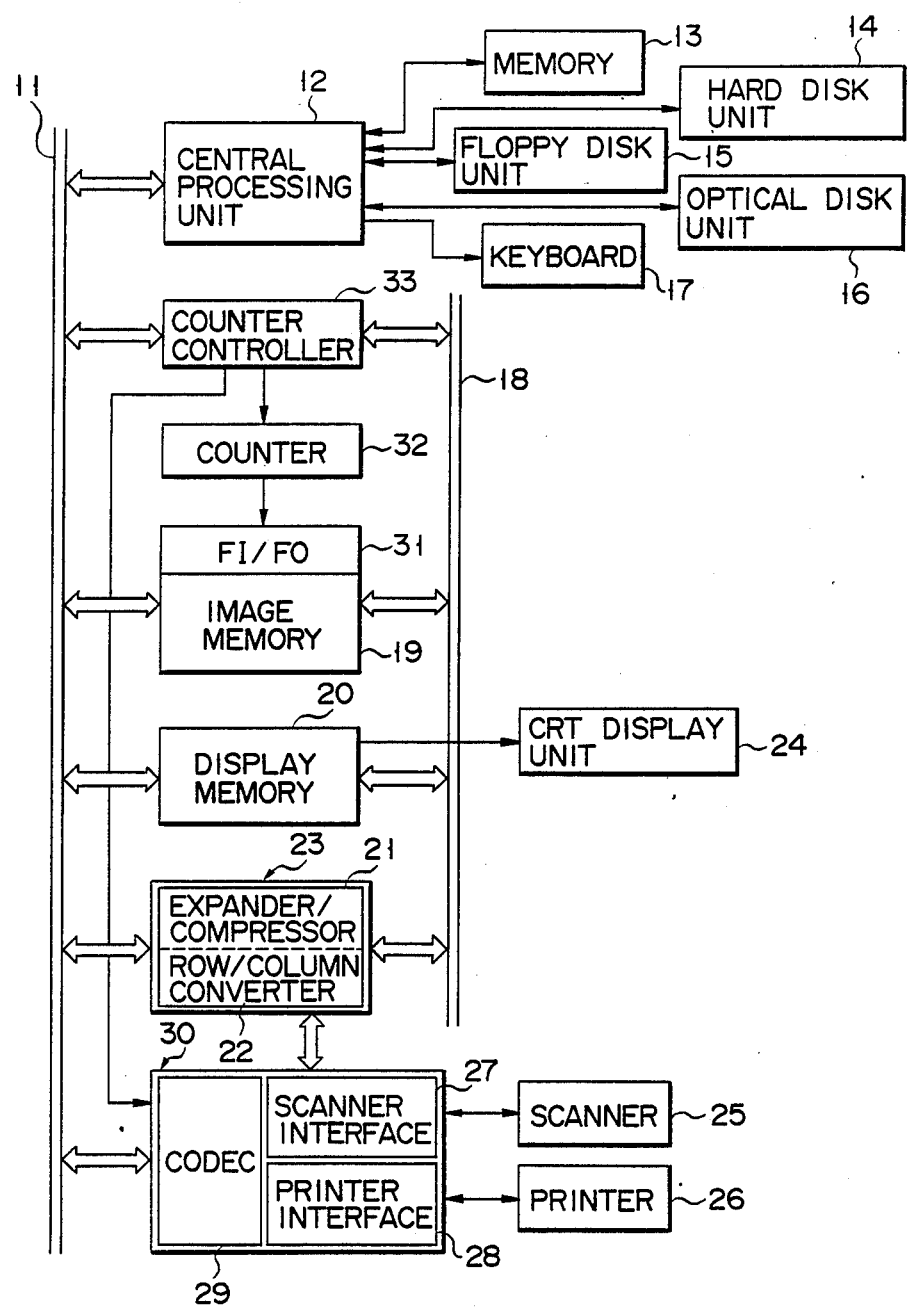
F I G. 1

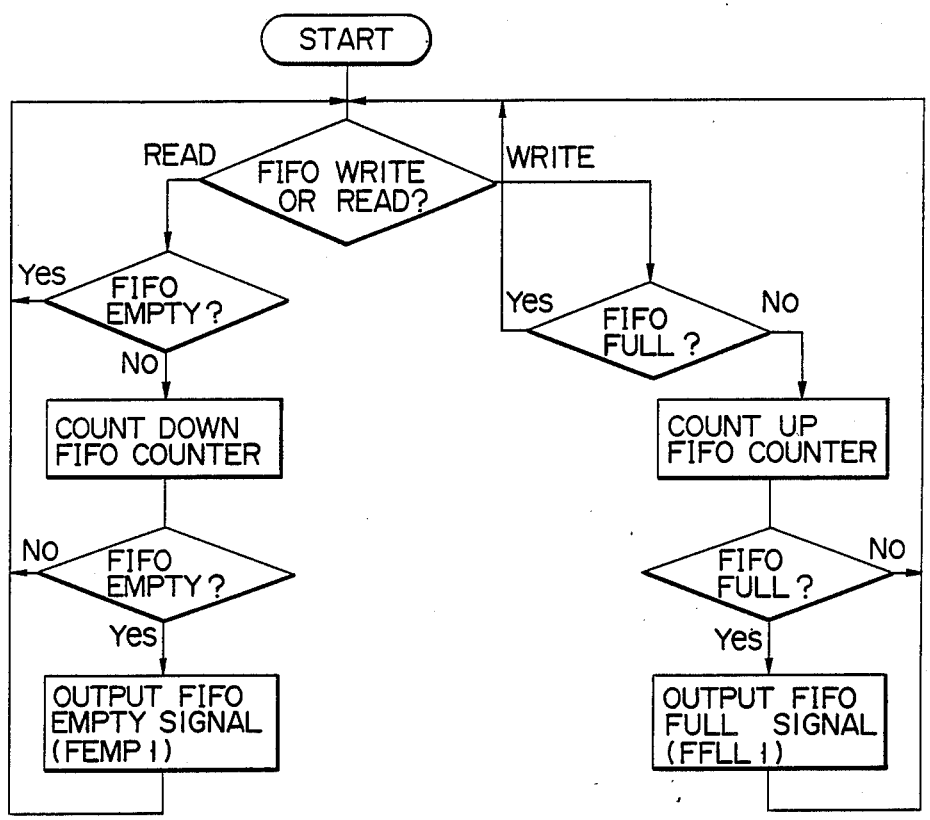
F I G. 3

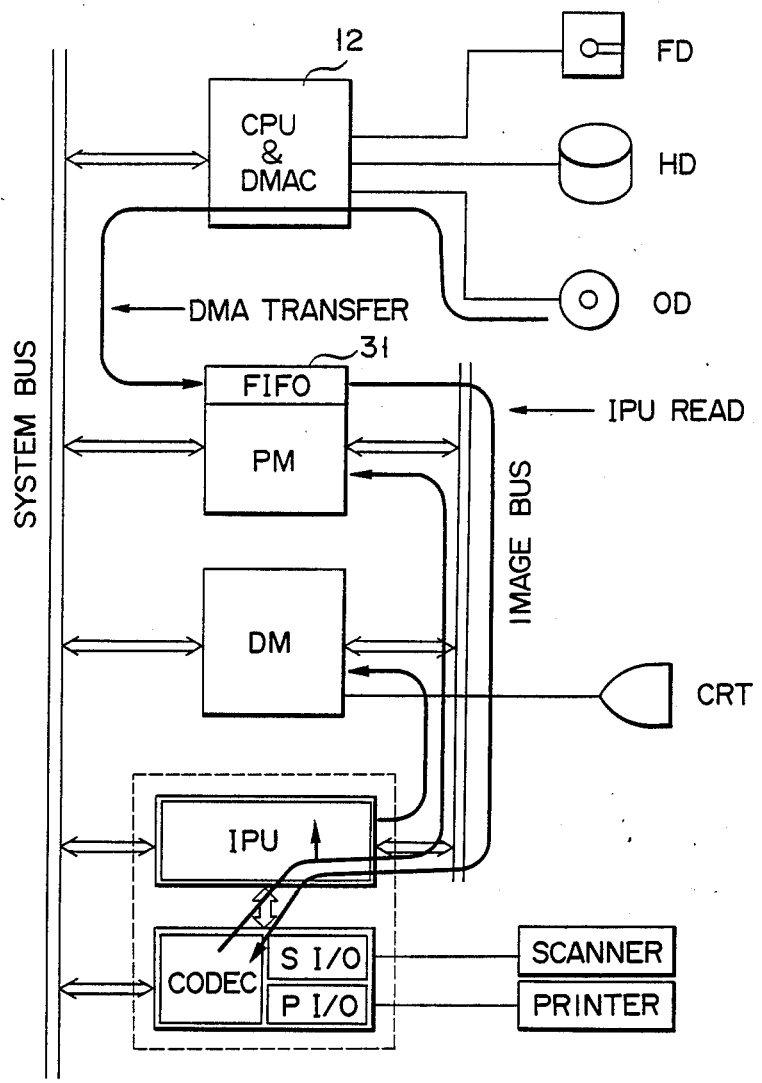
F I G. 5

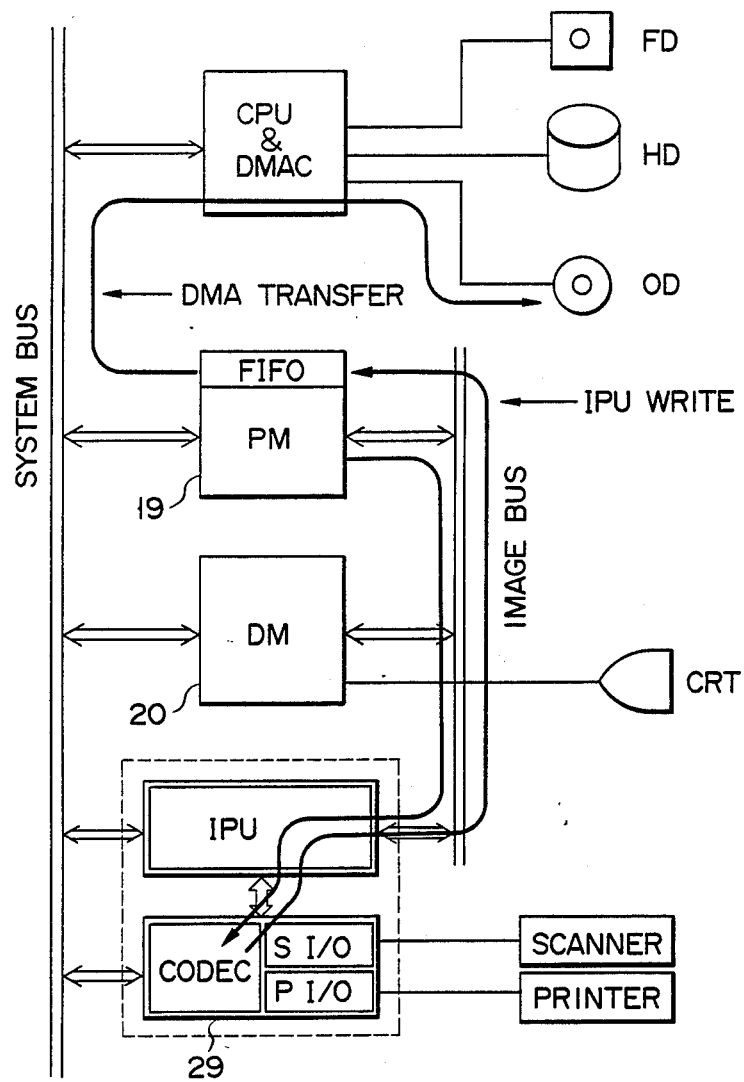
F I G. 6

4,922,437

IMAGE INFORMATION PROCESSING APPARATUS

BACKGROUND OF THE INVENTION

The present invention relates to an image information processing apparatus using, e.g., an optical disk.

As is well known, an image information processing apparatus, capable of recording image information in an optical disk, reading out the image information recorded in the optical disk, and displaying the image information on a CRT display unit, has been developed. In such an image information processing apparatus, in order to record the image information in the optical disk or to read out and display the image information recorded in the optical disk, coding or decoding is performed by a codec circuit. In this case, coding or decoding is executed through a buffer memory provided between an image memory and the codec circuit. Therefore, when coding/decoding of data stored in the buffer memory is completed, coding/decoding of the next data cannot be performed until data in the buffer memory is output and new data is transferred to the buffer memory. That is, the codec circuit must wait for a response from the buffer memory. Moreover, in this case, since an image bus is kept occupied by the codec circuit, other I/O units cannot use the image bus. As a result, it is difficult to transfer information at a high speed.

SUMMARY OF THE INVENTION

It is, therefore, an object of the present invention to provide an image information processing apparatus in which a codec circuit need not wait for a response from a memory and information can be transferred at a high speed.

According to the present invention, there is provided an image information processing apparatus in which a FIFO storing area is provided integrally with a page memory and is controlled to perform a read/write operation independently of the page memory and information is transferred to the codec circuit through this FIFO storing area.

According to the present invention, there is provided an image information processing apparatus comprising: an image memory for storing image information; a codec circuit for coding the image information stored in the image memory and decoding the image information read out from the image memory; a memory device having FIFO memory area and a page memory area, the FIFO memory area, provided between the image memory and the codec circuit, for sequentially supplying the image information read out from the image memory to the codec circuit, and for sequentially supplying the image information output from the codec circuit to the image memory; and control means for supplying a control signal corresponding to a stored state (full or empty) of the image information stored in the FIFO memory and controlling an operation of the codec circuit.

BRIEF DESCRIPTION OF THE DRAWINGS

FIG. 1 is a circuit diagram of an embodiment of an image information processing apparatus according to the present invention;

FIG. 3 is a flow chart for explaining a read/write operation of a FIFO memory;

FIG. 5 is a schematic view showing a data flow in searching and display modes; and FIG. 6 is a schematic view showing a data flow in registering mode.

DETAILED EXPLANATION OF THE PREFERRED EMBODIMENT

Figure 2:
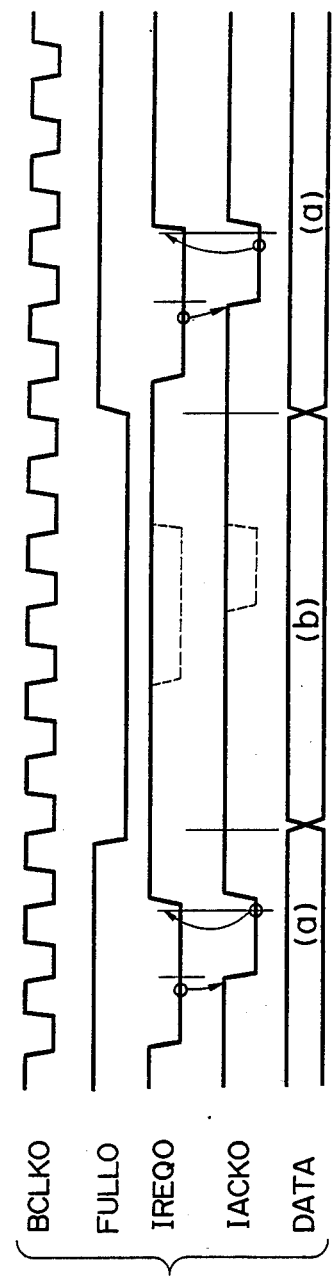
FIG. 2 is a timing chart for explaining a searching operation of image information.

FIG. 1 shows an arrangement of an image information processing apparatus. System bus 11 is connected to CPU (Central Processing Unit) 12 which controls an entire apparatus. CPU 12 is connected to memory 13 which stores an operation program of CPU 12, hard disk unit 14 which stores retrieval data for identifying image information, floppy disk unit 15, optical disk unit 16 which stores the image information, and keyboard 17 for inputting various control data and the retrieval data.

Image memory 19, display memory 20, and image processing module 23 including expander/compressor 21 for expanding/compressing the image information and row/column converter 22 for row/column-converting the image information are connected between system bus 11 and image bus 18. CRT display unit 24 is connected to display memory 20.

Scanner (two-dimensional scanning unit) 25 optically scans an original (e.g., a document) and outputs an electrical signal corresponding to image information of the original. Printer 26 prints out the image information scanned by scanner 25, the image information read out from optical disk unit 16, and the like. Scanner 25 and printer 26 are connected to codec circuit 29 by scanner interface 27 and printer interface 28, respectively. Interfaces 27 and 28 and codec circuit 29 constitute module 30 which is connected to system bus 11 and image processing module 23.

First-in First-out (FIFO) memory area 31 is provided in part of image memory 19. Data is read from and written into FIFO memory area 31, under the control of counter 32. Counter controller 33 is connected to counter 32 and controls it. The page memory area of image memory 19 is accessed by CPU 12.

Controller 33 is connected to system bus 11 and image bus 18. When an information-write request is sent from system bus 11, counter 32 is controlled by controller 33 so that it counts up. Thus, FIFO memory area 31 is accessed by the count-up data of counter 32 to sequentially store image information supplied from image bus 18. When an information-transfer request is sent from image bus 18, counter 32 is controlled by controller 33 so that it counts down. FIFO memory area 31 is accessed by the count-down data of counter 32 to read out the image information stored.

Controller 33 is connected to codec circuit 29 through signal line 34. Controller 33 outputs control signal EMPTYO at a low level, representing that FIFO memory area 31 is "EMPTY", and signal FULLO at the low level, representing that FIFO memory area 31 is "FULL", to codec circuit 29 through signal line 34.

It will be described how desired image information is retrieved from optical disk unit 16 and displayed on CRT display unit 24.

Image information read out from optical disk unit 16 is coded and sequentially stored into FIFO memory area 31 through CPU 12 and system bus 11. The stored image information is sequentially output from area 31 in the FIFO manner and then transferred to FIFO memory area 31 through system bus 11. The image information is passed through expander/compressor 23 and converter 22 without any processing.

The image information decoded by codec circuit 29 is stored into image memory 19. The image information is also stored into display memory 20 after it has been expanded or compressed to a required size, and then is supplied from memory 20 to CRT display unit 24 to be displayed thereon.

When the image information, read out from optical disk unit 16 and stored in FIFO memory area 31, is to be transferred to codec circuit 29, and area 31 becomes "EMPTY", signal EMPTYO supplied from controller 33 to codec circuit 29 is of a low level. Codec circuit 29 is stopped in accordance with signal EMPTYO, and image bus 18 is released. When FIFO area 31 is recovered from "EMPTY", and signal EMPTYO is switched to high level, image information is transferred again to codec circuit 29.

It will now be described how to register the image information input from, e.g., scanner 25, in optical disk unit 16.

Image information input from scanner 25 is stored into image memory 19 through scanner interface 27 and image bus 18. The image information stored in image memory 19 is supplied to codec circuit 29 through image bus 18. Codec circuit 29 encodes the supplied image information. The codedimage information is transferred to FIFO memory area 31 through image bus 18.

When FIFO memory area 31 becomes "FULL", signal FULLO output from controller 33 is switched to the low level. In accordance with signal FULLO, codec circuit 29 temporarily stops outputting the image information, and image bus 18 is released. In this state, information stored in FIFO memory area 31 is sequentially transferred to optical disk unit 16 through CPU 12. If FIFO memory area 31 is not full, the image information is again transferred from codec circuit 29 to FIFO memory area 31.

It will now be explained how to search for the image information described above, with reference to FIG. 2.

First, the image information is retrieved from FIFO memory area 31 and transfered to codec circuit 29. At this time, codec circuit 29 outputs image information request signal IREQO to controller 33, and controller 33 outputs image information transfer end signal IACKO to codec circuit 29, thereby completing transmission/reception of one image information.

When FIFO memory area 31 becomes empty, signal EMPTYO output from controller 33 is switched to low level. In accordance with signal EMPTYO, codec circuit 29 stops the operation, and image bus 18 is released. In this state, other units are enabled and output signals IREQO and IACKO therebetween, thereby performing transmission/reception of information as represented by DATA (b) in FIG. 2.

In the above state, when FIFO memory area 31 is recovered from the "EMPTY" state after a predetermined time has passed, signal EMPTYO is switched to high level, and the image information is transmitted/received between FIFO memory area 31 and codec circuit 29 again as represented by DATA (a) in FIG. 2. Note that in FIG. 2, reference symbol BCLKO denotes a bus clock signal.

In the above embodiment, when FIFO memory area 31 becomes empty during the searching operation of the image information, and when FIFO storing area 31 becomes FULL of the image information supplied from codec circuit 29 during the registering operation of the image information with respect to optical disk unit 16, codec circuit 29 is stopped, and image bus 18 is released. Therefore, codec circuit 29 need not wait for a response from FIFO area 31, and hence image bus 18 is not occupied by codec circuit 29, i.e., can be effectively utilized. For example, the image information retrieved from optical disk unit 16 can be transferred to image memory 19 and display memory 20 at the same time, and a transfer speed of the image information can be largely increased.

Figure 4:
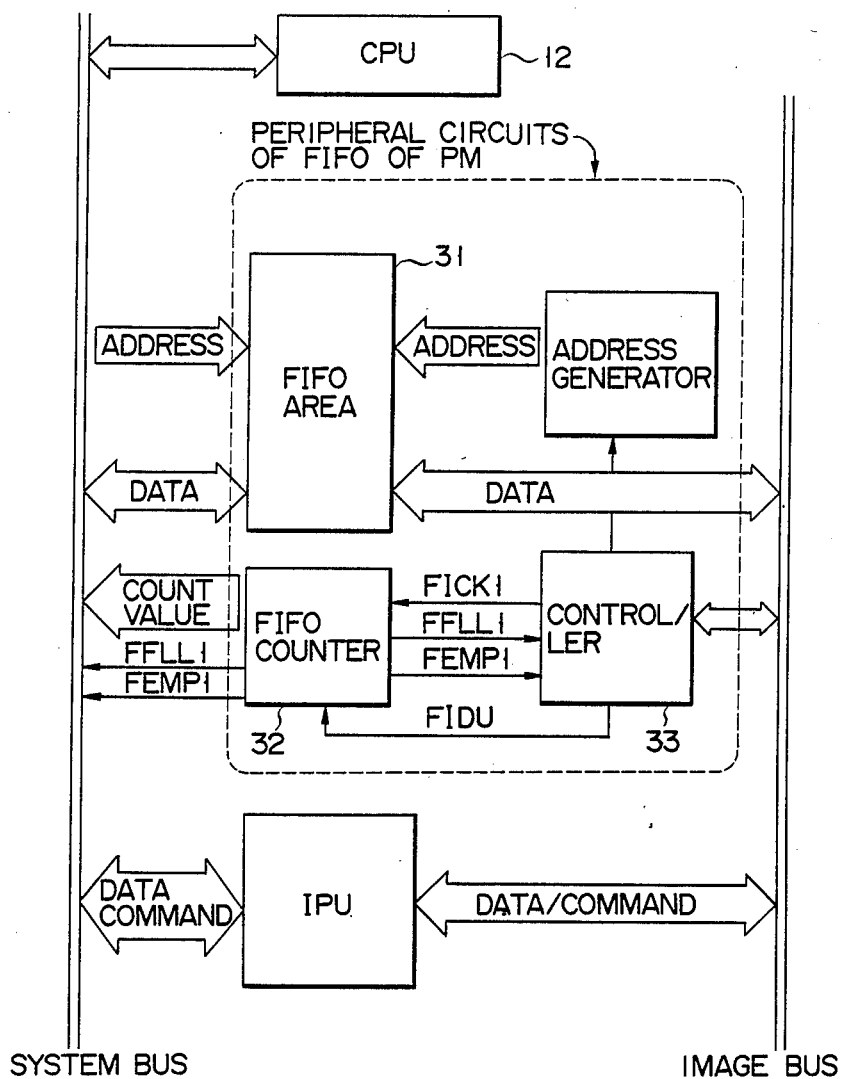
FIG. 4 is a circuit diagram showing circuits associated with the FIFO memory area.

Data transfer using the FIFO memory area will be described in more detail with reference to FIGS. 3 and 4.

In response to start of the operation, CPU 12 checks whether a write mode or a read mode is set in FIFO memory area 31. If the write mode is set, CPU 12 checks whether FIFO memory area 31 is full. If FIFO memory area 31 is not full, counter 32 is counted up in response to signal FIDU(H) from controller 33 and in synchronism with clock signal FICK1. Immediately after this count up, an address from CPU 12 or address generator (not shown) designates FIFO memory area 31 as an address. At this time, data is stored in the address.

Then, CPU 12 checks whether FIFO memory area 31 is full. If FIFO memory area 31 is not full, the operation returns to the FIFO read or write flow. When the count value of counter 32 reaches a maximum value, i.e., 64K after the above operation is repeated, counter 32 outputs signal FFLL1 which represents that FIFO memory area 31 is full. CPU 12 detects signal FFLL1 and stops writing in FIFO memory area 31.

In the FIFO read mode, CPU 12 checks whether FIFO memory area 31 is empty. If FIFO memory area 31 is not empty, controller 33 inputs count down signal FIDU (L) to counter 32. Counter 32 counts down in response to signal FIDU (L) and in synchronism with the clock signal. Immediately after this count down, data is read out from the address from CPU 12 or the address corresponding to a value of the address generator. Thereafter, counter 32 continuously counts down and data are continuously read out from FIFO memory area 31 until FIFO memory area 31 becomes empty.

When counter 32 is counted down to 64K, i.e., when FIFO memory area 31 becomes empty, counter 32 outputs signal FEMP1, which represents that area 31 is empty, to controller 33 and system bus 11. CPU 12 stops data reading in response to signal FEMP1.

The read/write operation of the FIFO is performed as described above. In this case, writing is performed not in synchronism with reading, a read address cannot advance further than a corresponding write address, and the write address cannot advance further by 64K than the read address.

FIG. 5 shows a data flow in which data is retrieved from, e.g., recording disk OD and displayed. In FIG. 5, image data read out from disk OD are sequentially written in FIFO memory area 31 through CPU 12. The written image data are sequentially read out from FIFO memory area 31 in the FIFO manner and input to an IPU (Image Processing Unit) through image bus 18. The image data are subjected to expansion/compression processing or row/column conversion processing as needed and then input to codec circuit 29. The image data decoded by codec circuit 29 are directly stored in the page memory area of image memory 19 which is formed integrally with FIFO storing area 31 and at the same time signal-processed by the IPU and then stored in display memory 20 as video data. The video data are displayed on CRT 24.

FIG. 6 shows a data flow in which image data is stored. In FIG. 6, image data output from, e.g., scanner 25 is stored in page memory area of image memory 19 through codec circuit 29 and system bus 11. The image data read out from the page memory area are inputted to codec circuit 29. The image data coded by codec circuit 29 are sequentially written in FIFO memory area 31 through image bus 18. The image data are sequentially read out from FIFO memory area 31 in the FIFO manner and stored in, e.g., recording disk OD through CPU 12.

As has been described above, according to the present invention, a FIFO memory is provided with a page memory, and a read/write operation of the FIFO memory is controlled by a counter and a counter controller independently of a Central Processing Unit (CPU). As a result, a load applied on the CPU can be reduced, and image information can be transferred at a higher speed. In addition, since the page memory and the FIFO memory can be arranged integrally with each other, an apparatus can be made compact.

What is claimed is:

1. An image information processing apparatus comprising:
   image memory means for storing image information;
   codec means, connected to said image memory means, for coding the image information stored in said image memory means and decoding the image information read out from said image memory means;
   said image memory means including first-in first-out memory means, provided between said image memory means and said codec means, for sequentially storing the image information read out from said image memory means and sequentially supplying the image information to said codec means in a first-in first-out manner, and for sequentially storing the image information output from said codec means and transferring the image information to said image memory means in the first-in first-out manner;
   detecting means connected to said first-in first-out memory means, for detecting the storage state of said first-in first-out memory means;
   control means, connected to said detecting means and said first-in first-out means, for controlling the operation of said first-in first-out memory means in accordance with the storage state of said first-in first-out memory means; and
   buffer memory means, provided integrally with said first-in first-out memory means, for storing the decoded image information supplied from said codec means.

2. An apparatus according to claim 1, wherein said control means stops an operation of said codec means in response to a full or empty state of said first-in first-out memory means.

3. An apparatus according to claim 1, wherein said image memory means comprises an optical recording medium.

4. An apparatus according to claim 1, wherein said control means comprises a CPU which detects whether said first-in first-out memory means is full or empty and outputs first and second signals respectively corresponding to full and empty states and said detecting means includes count means which is counted up in response to the second signal and outputs count information, and said CPU supplies an address data corresponding to the count information, to said first-in first-out memory means.

5. An image information processing apparatus comprising:
   input means for inputting image information;
   buffer memory means for storing the image information output from said input means;
   coding means for coding the image information read from said buffer memory means;
   said buffer memory means including first-in first-out memory means for sequentially storing the image information coded by said coding means and sequentially outputting the image information, in a first-in first-out manner, said first-in first-out memory means being provided integrally with said buffer memory means;
   detecting means for detecting the storage state of said first-in first-out memory means;
   control means for controlling an operation of said first-in first-out memory means in accordance with the storage state of said first-in first-out memory means; and
   optical memory means for storing the image information output from said first-in first-out memory means.

6. An image information processing apparatus according to claim 5, wherein said input means comprises a scanner for scanning a document to produce the image information.

7. An image information processing apparatus comprising:
   optical memory means for storing image information;
   first-in first-out memory means for sequentially storing the image information read from said optical memory means and sequentially outputting the image information, in a first-in first-out manner;
   detecting means for detecting the storage state of said first-in first-out memory means;
   control means for controlling an operation of said first-in first-out memory means in accordance with the storage state of said first-in first-out memory means;
   decoding means for decoding the image information output from said first-in first-out memory means;
   buffer memory means for storing the image information decoded by said decoding means, said buffer memory means being provided integrally with said first-in first-out memory means; and
   output means for visually outputting the image information read from said buffer memory means.

8. An image information processing apparatus according to claim 7, wherein said output means comprises a display unit for displaying the image information.

9. An image information processing apparatus according claim 7, wherein said output means comprises a printer for printing out the image information.

* * * * *